United States Patent
Wobben (10) Patent No.: US 7,337,726 B2
(45) Date of Patent: Mar. 4, 2008

(54) WIND FARM

(76) Inventor: Aloys Wobben, Argestrasse 19, Aurich (DE) D-26607

( * ) Notice: Subject to any disclaimer, the term of this patent is extended or adjusted under 35 U.S.C. 154(b) by 324 days.

(21) Appl. No.: 10/399,574

(22) PCT Filed: Sep. 8, 2001

(86) PCT No.: PCT/EP01/10391

§ 371 (c)(1),
(2), (4) Date: Sep. 18, 2003

(87) PCT Pub. No.: WO02/32739

PCT Pub. Date: Apr. 25, 2002

(65) Prior Publication Data

US 2004/0056486 A1    Mar. 25, 2004

(30) Foreign Application Priority Data

Oct. 17, 2000    (DE) .............................. 100 51 513

(51) Int. Cl.
*B61B 7/00*    (2006.01)

(52) U.S. Cl. ............... 104/112; 104/173.1; 104/18; 104/249; 104/251

(58) Field of Classification Search ............... 104/106, 104/111, 112, 183, 173.1, 173.2, 115, 114, 104/88.02, 88.03, 88.04, 122, 251, 249, 250, 104/252, 253, 113, 180; 290/44, 55; 105/30; 410/96; 246/122 R; 293/21; 212/76, 77, 212/78, 71, 72, 79, 83, 87, 94, 97, 98, 328

See application file for complete search history.

(56) References Cited

U.S. PATENT DOCUMENTS

| | | | | |
|---|---|---|---|---|
| 807,089 A | * | 12/1905 | Pfaffenbach et al. ...... | 104/172.4 |
| 1,149,764 A | * | 8/1915 | Hinsen ...................... | 104/115 |
| 3,210,114 A | * | 10/1965 | Lawton ..................... | 294/81.4 |
| 3,218,988 A | | 11/1965 | Gaston et al. | |
| 3,575,251 A | * | 4/1971 | Moore ....................... | 180/219 |
| 3,675,794 A | * | 7/1972 | Ingram et al. ........... | 414/138.3 |
| 3,710,726 A | * | 1/1973 | Buchholz et al. ......... | 104/112 |
| 4,014,516 A | * | 3/1977 | Jacks ....................... | 254/134.5 |
| 4,473,011 A | * | 9/1984 | Wuschek ................. | 104/173.1 |
| 4,509,430 A | | 4/1985 | Creissels ................ | 104/173 R |
| 4,864,937 A | * | 9/1989 | Kunczynski ............. | 104/173.1 |
| 5,026,230 A | * | 6/1991 | Dolezych et al. .......... | 410/100 |
| 5,129,605 A | * | 7/1992 | Burns et al. .................... | 246/5 |
| 5,172,640 A | | 12/1992 | Cathiard .................. | 104/173.2 |
| 5,445,094 A | | 8/1995 | Kai et al. ................ | 114/65 R |
| 5,518,598 A | * | 5/1996 | Yang .......................... | 204/240 |

(Continued)

FOREIGN PATENT DOCUMENTS

DE    1 430 976    3/1969

(Continued)

*Primary Examiner*—Mark T. Le
(74) *Attorney, Agent, or Firm*—Seed IP Law Group PLLC (57) ABSTRACT

An offshore wind farm comprises a plurality of wind turbines. In order to provide such a wind farm with transport between separate wind turbines that can be effected more safely and with less dependence on weather, cable connection is provided between the wind turbines of the wind farm, and a gondola is disposed on the cable connection to carry cargo or personnel from one wind turbine to another.

89 Claims, 7 Drawing Sheets

U.S. PATENT DOCUMENTS

| | | | |
|---|---|---|---|
| 5,562,041 A * | 10/1996 | Ellens | 104/251 |
| 5,592,883 A | 1/1997 | Andress, III | 104/88.03 |
| 5,744,871 A | 4/1998 | Robles Akesolo | 290/55 |
| 5,920,827 A | 7/1999 | Baer et al. | 702/3 |
| 6,400,039 B1 * | 6/2002 | Wobben | 290/44 |

FOREIGN PATENT DOCUMENTS

| | | | |
|---|---|---|---|
| DE | 33 45 763 C2 | | 6/1985 |
| DE | 0536611 A2 | * | 4/1993 |
| DE | 42 41 677 A1 | | 6/1994 |
| DE | 43 34 589 A1 | | 6/1994 |
| DE | 298 17 382 U1 | | 2/1999 |
| DE | 197 26 408 C1 | | 3/1999 |
| DE | 197 47 237 A1 | | 4/1999 |
| DE | 198 05 667 A1 | | 8/1999 |
| DE | 200 06 959 U1 | | 7/2000 |
| DE | 200 08 289 U1 | | 8/2000 |
| GB | 2 041 320 A | | 9/1980 |
| GB | 2041320 A | * | 9/1980 |
| GB | 2 104 022 A | | 3/1983 |
| JP | 63-283407 | * | 11/1988 |
| JP | 2-8192 | * | 1/1990 |
| JP | 2-136008 | | 5/1990 |
| JP | 03057885 A | * | 3/1991 |
| JP | 09151077 A | * | 6/1997 |
| JP | 2709723 | | 10/1997 |
| JP | 2001247289 A | * | 9/2001 |
| WO | WO 96/10130 | | 4/1996 |
| WO | 9902856 | | 1/1999 |
| WO | WO 99/43956 | * | 9/1999 |
| WO | WO 99/53199 | * | 10/1999 |

* cited by examiner

WIND FARM

BACKGROUND OF THE INVENTION

1. Field of the Invention

The present invention relates to a wind farm comprising at least two wind turbines and in particular to an offshore wind farm.

2. Description of the Related Art

The wind turbines in wind farms are spaced from one another at such distances that any collision of blades is securely avoided even when the wind turns direction, and the effects of one wind turbine on another as a result of changing air flow conditions are kept as small as possible. The distance between wind turbines is dependent on the radius of the circle swept by the rotor of a wind turbine and, with rotor diameters in excess of 100 m now possible at the current state of technological development, the distance between wind turbines will increase still further due to the even larger dimensions of new wind turbines.

Depending on location and size, each wind turbine requires maintenance and the elimination of any malfunctions that may arise. To do this, personnel and material must be transported to the wind turbine.

It is relatively easy to bring personnel and material to every wind turbine on land-based wind farms, whereas in the case of offshore wind farms this involves much greater effort and expense. The process can be simplified by bringing people and goods, such as tools, spare parts, etc. to one place only, rather than having to call at each separate wind turbine on a wind farm.

The problem which then arises is that of distributing landed goods, or generally of transporting goods and/or people between the wind turbines of a wind farm, and particularly of an offshore wind farm.

Based on the premise that a wind farm has a central landing place where all goods and persons arrive or depart, the latter must accordingly be transported between the separate wind turbines of the wind farm.

A characteristic of offshore wind farms is that the weather there is always rougher than on land. Winds can blow obstructed and quickly reach high speeds.

Furthermore, waves of greater or lesser height must be expected at all times. Therefore, transporting goods and ferrying people to the separate wind turbines is not only unpleasant in many cases, but may even involve a considerable degree of risk.

The object of the present invention is therefore to provide a wind farm in which transportation between the separate wind turbines can be carried out safely and securely.

BRIEF SUMMARY OF THE INVENTION

This object is accomplished according to the invention by a cable connection between at least two of the wind turbines 12 and by a gondola 14 disposed on said cable connection. Transportation of people and goods between the wind turbines 12 can be achieved with said gondola 14. Advantageous embodiments for other wind farm structures are described in the following.

The cable connection is preferably spanned at such a height that it neither impinges on the rotor diameter of the wind turbine 12 nor touches the crests of waves, even when the waves are high.

A deflection member for the cable connection can be provided on each wind turbine, such that the cable connection is spanned as an endless cable loop between the deflection members and the gondola 14 is fixedly connected to the cable connection. By this means, the gondola 14 can be driven in the desired direction by moving the cable connection, and the structure is kept very simple.

When there are two wind turbines 12 connected to each other, the cable connection travels around the deflection member at each wind turbine 12 and back to the other wind turbine. When the cable connection connects at least three wind turbines 12 with each, the deflection member on the middle wind turbines 12 serves as a support, and the cable connection is guided onwards to the respective outer wind turbine.

The cable connection can be moved by means of a motor, and preferably by an electrically driven motor 15. This is particularly advantageous, because electrical energy is generated in the wind farm and is therefore readily available, thus obviating the need to transport other energy carriers, such as fuel. Electric motors can also be controlled in a simple manner. In one embodiment, electrical energy generated in the wind farm is used to power the electric motor drive. The electrical energy may be selectively drawn at a generator 140, or an intermediate DC circuit 142.

The cable connection suitably comprises a main cable and a traction cable. Although the gondola 14 is mounted on the main cable, it is able to travel in relation to said main cable. The traction cable is attached to the gondola 14. When the traction cable is pulled in the desired direction of travel, the gondola 14 moves along the main cable in the desired direction. This traction on the traction cable can be provided by a motor. Electrical energy is advantageously used as the drive energy.

The deflection member preferably comprises two independently rotatable deflection pulleys, whereby the main cable is guided over one roller and the traction cable over the other roller. The traction cable can be configured as a circulating endless cable loop, whereas the main cable can be provided only once along the stretch traveled by the gondola 14. Due to the endless traction cable, it is sufficient to have a reversible drive for the traction cable in order to drive the gondola 14 in the desired direction, and one can dispense with any reeling devices for the traction cable at the two ends thereof.

In one particularly preferred embodiment of the invention, the gondola 14 moves along the main cable under its own power. A motor drive and preferably an electromotor drive 100 (FIG. 4) can be provided for this purpose, whereby the store of energy 102 (FIG. 4) for driving the motor is provided in an energy storage means 102 in the gondola 14, for example in a battery.

A manual drive 104 (FIG. 4) may be provided as an alternative to the motor drive, or as a supplementary emergency drive so that the gondola 14 can be moved in emergency operation even when there is a failure of the motor or the energy store.

In a particularly preferred embodiment of the invention, the drive energy is supplied via the cable connection, the main cable, the traction cable and/or a separate conductor line when the gondola 14 is driven electrically. By this means, control signals can also be transmitted to the gondola 14 and/or a tower 12a by remote control, for example to control the drive motor 15 (FIG. 4) or a winch or the like.

In a preferred development of the invention, telemetry data, for example, are transmitted via the electrical connection to a central wind turbine 12 or to several wind turbines. Furthermore, it is possible via the cable connection to process the communications, with each other and with the gondola 14, of all the wind turbines 12 in the wind farm between which the cable car 14 is provided.

In an alternative embodiment of the invention, these communications, that is to say, for example, the transmission of telemetry data, control signals, etc. between separate wind turbines 12 on the wind farm and/or the gondola 14, can be effected at least in part by wireless transmission.

The cable connection can be structured in different ways. A simple structure is based on the principle of a chain, in which all wind turbines 12 are connected to each other by the cable connection "like beads on a chain". In this structure, the cable connection is a single continuous cable connection that connects at least some of the wind turbines 12 in a predefinable series with each other.

However, the wind turbines 12 may also be positioned in several rows, for example in three rows, and the cable connection follows, for example, a path in the shape of the letter "S" between the wind turbines 12 to connect the wind turbines 12 with each other.

An alternative variant of the cable system is a star-shaped arrangement of the cable connection, starting from a central wind turbine 12 representing, for example, a central landing place, so that all other wind turbines 12 can be reached by the shortest possible path.

Another variant is a networked cable system that not only provides shortest possible connections from a central wind turbine 12 to the other wind turbines, but also forms relatively short stretches between all the wind turbines.

In order to keep the horizontal displacement of the gondola 14 on the cable connection low while the gondola 14 is travelling between the wind turbines 12 of a wind farm, or to prevent such displacement within certain limits, the wind farm according to the invention has, in a preferred development, a holding cable that is provided at a predefined vertical distance parallel to the cable connection. The distance is dimensioned in such a way that the gondola 14 is guided between the cable connection and the holding cable. In this arrangement, the cable connection is preferably above the gondola 14, and the holding cable is below the gondola 14.

In a particularly advantageous development of the invention, one (upper) part of the endless cable loop in a cable connection configured as an endless loop can carry the gondola 14, while the other (lower) part of the endless cable loop performs the function of the holding cable.

In an alternative embodiment, a flywheel mass rotating about a vertical axis is used to stabilize the gondola 14. Said flywheel mass is driven by a motor and acts as a gyroscope to counter any horizontal displacement of the gondola 14.

Preferably, each wind turbine 12 of the wind farm has a closeable door in its tower. Said door is generally located at the height at which the gondola 14 reaches the wind turbine. This enables loading activities to be performed without having to overcome a difference in height.

In another preferred development, the wind turbines 12 and the gondola 14 have a locking device 106 (FIG. 4) that permits the loading and unloading position of the gondola 14 to be prescribed, such that swinging movements of the gondola 14 relative to the tower 12a of the wind turbine 12 are prevented when the gondola 14 is in said position. The locking device 106 is preferably configured in such a way that one part of the locking device 106 is provided close to the door on the tower 12a of the wind turbine, and the other part at a suitable position on the gondola 14. A particularly preferred embodiment is one in which the locking device 106 is a two-point locking device, in order to avoid the formation of a pivotal point that occurs when locking operates at one point only.

Preferably, said locking device 106 can function electromagnetically and be switched on and off by operating a switch inside the tower 12a and/or from the gondola 14. This enables convenient and secure handling without the risk of injury as a result of a swinging gondola 14 that may, for example, collide with the tower 12a due to wind action.

In one preferred development of the invention, the locking device 106 can be remotely controlled, and it is particularly preferred for it to be remotely controllable from the gondola 14 so that manual operation can be avoided. By this means, the latent risk of injury when operating the locking device 106 is further reduced.

A particularly preferred embodiment is one in which a cover of substantially horizontal extension is mounted above the opening on at least one wind turbine, said cover bearing a protective wall extending substantially vertically and at a predefined distance parallel to the cable connection. By means of the cover and the protective wall, which enclose a predefined angle, a protective roof is formed that protects the gondola 14 when in the area of the opening as well as the opening itself against weather. The gondola 14 and the opening are protected by the tower 12a itself, on the one hand, and by the protective roof, on the other, such that the gondola 14 is shielded against the wind and is not pushed against the tower.

If the protective roof is made long enough, displacement of the gondola 14 and hence a potential collision with the tower 12a can be avoided even when the wind or wind vectors are transverse to the direction in which the gondola 14 is travelling.

The horizontal spacing between the outer ends of the first protective wall 36 and the tower 12a is preferably greater than the horizontal spacing to the central portion of the protective wall 36. In this way, collisions between the gondola 14 and the protective wall 36 are prevented even when the gondola 14 is horizontally displaced towards the protective wall 36, for example by cross winds.

In one preferred development of the invention, additional protective walls 36 can be attached to the tower 12a on both sides of the opening parallel to the first protective wall 36 and at the same height, said additional walls extending the area in lee of the tower 12a such that a wind vector transverse to the direction in which the gondola 14 is travelling does not push the latter against the outer protective wall 36. The horizontal distance between the protective walls 36 at the tower 12a can be substantially equal to the width of the gondola 14 and enlarge towards the lateral ends of the protective walls 36, such that a horizontal displacement of the gondola 14 in the entry area between the protective walls 36 does not lead to collisions between the gondola 14 and one of the protective walls 36.

The gondola 14 itself can preferably be fitted with elastic coating 132 (FIG. 5) at each of the corners on the lower portion of the gondola cabin 130, and hence at those points that will be affected first in the event that a collision with other facilities of the wind farm occurs as a result of the gondola 14 being horizontally displaced. On the one hand, said coatings 132 dampen any collision that might occur, thus preventing damage occurring to the gondola 14 and other facilities of the wind farm, and on the other hand they serve as buoyancy aids to keep the gondola 14 buoyant in the event of an accident.

At the same time as, or in place of the elastic coating 132 on the gondola 14, such a coating 132 may also be provided on the protective walls 36, especially in the entry area and at a height at which a horizontally displaced gondola 14 first collides with the protective wall 36. A particularly preferred embodiment is one in which a first gangboard 110 (FIG. 8) is provided at the second protective wall 38, said gangboard having a retention facility 112, such as a railing, all around it. In one advantageous development of the invention, the gangboard extends over the entire length of the protective wall 36 and is attached in such a way that it can be reached from the opening.

By this means, the outer side of the gondola 14 can be reached in order to perform repair work and/or maintenance and cleaning work, for example. If the second protective wall 38 is present, the gangboard 110 can be delineated on one side by said protective wall 38, and a retention facility 112 can be dispensed with there.

It is particularly preferred to provide a second gangboard 110 parallel to the first on the first protective wall 36. Said second gangboard 110, too, has a retention facility on the sides which are not adjacent to the first protective wall 36.

As a further preferred embodiment, a transverse gangboard can be provided at least one outer end of the first and second gangboards, wherein said transverse gangboard bridges the gap between the substantially parallel first and second gangboards 110.

To enable unobstructed entry and exit of the gondola 14, the transverse gangboard 110 can be pivotably coupled at one of its ends and pivoted upwards about its pivot axis in order to clear the way for the gondola 14 to pass through. In one advantageous development of the invention, such transverse pivotable gangboards 110 are coupled at both ends of the first or the second gangboard, thus enabling all sides of the gondola 14 to be reached from the outside.

The gap between one transverse gangboard 110 and the other is preferably selected so that it is substantially equal to the relevant dimensions of the gondola 14. In one particularly preferred development of the invention, at least one of the transverse gangboards 110 is slideable along its pivotal axis, such that the distance between the transverse gangboards 110 can be altered and hence adjusted to the respective requirements.

On at least one wind turbine 12 tower, a hoisting apparatus 126 (FIG. 4) can be provided, preferably under the protective roof, said hoisting device 126 enabling the handling of heavy freight, on the one hand, and, on the other hand, the handling of the gondola 14 and gondola parts, for example for repairs. By means of such a hoisting apparatus 126, provided it is designed for an appropriate load, the entire gondola 14 can be hoisted so that the underside of the gondola 14 can be reached from the gangboard for repair, maintenance and cleaning purposes.

In one alternative embodiment of the invention, a suitably mounted single- or multi-part working platform 114 (FIG. 8) can be provided in place of gangboards in order to reach the outer sides of the gondola 14. To this end, the area of the working platform can have a minimum size that enables all sides of the gondola 14 to be accessed from the outside.

In another alternative embodiment of the invention, a working cage or a crown safety platform 116 (FIG. 7) can be provided, wherein said cage or platform can be moved and/or pivoted such that the outer sides of the gondola 14 can be reached. The crown safety platform 116, like the working platform 114, is enclosed on all sides by a retention facility in order to prevent any unintentional fall from the platform or cage on the part of personnel working thereon.

In some embodiments, a first guide rail 118 (FIG. 8) is disposed on the tower 12a of one of the plurality of wind turbines 12 close to the opening 18 and extending substantially parallel to the cable connection. A second guide rail 118 extends at a predefined distance substantially parallel to the first guide rail. A gap 120 is between the first guide rail 118 and the second guide rail 118, the gap increasing in size in a predefined portion at a distance form the opening 18. The guide rails 118 may support the protective walls 36, 38.

In some embodiments, load anchoring facilities 122 (FIG. 4) and lashing means 122 for securing objects to the anchoring facilities are in the gondola 14. Further, a hoisting device 124 located on the gondola 14 for handling the load being carried in some embodiments.

In one particularly preferred embodiment of the invention, the door is larger than the cross section of the gondola 14, and the cable system extends into the tower 12a of the wind turbine. This is achieved by having at least one set of points at each tower 12a along the cable connection. In this way, the gondola 14 can travel through the opened door in the tower 12a and be loaded and/or unloaded therein regardless of weather conditions.

A closed gondola 14 provides for transportation of people and goods in such a manner that they are substantially protected against the weather. In one particularly preferred development of the invention, the gondola 14 is configured so that it has a closeable exit opening through which the guide with which the gondola 14 is suspended from the cable connection and guided can be reached.

In order to avoid the loss of the gondola 14 in the event of it falling from the cable, the gondola 14 is preferably designed to be buoyant, and can dispose of signalling means such as signal guns, flares or the like, as well as buoyancy aids such as automatic self-inflating float rings. These buoyancy aids increase the buoyancy of the gondola 14 so that it remains buoyant even when loaded. In one preferred development of the invention, the gondola 14 has righting aids that at least make it more difficult for the gondola 14 to overturn, or indeed prevent it from doing so.

In order to effect monitoring of operation, or at least semi-automatic control of the cable car system, a central control device 134 as well as a plurality of sensors 44 and/or actuators 136 are provided. The sensors 44 and/or actuators 136 can be connected to the central control device 134 via an interface.

By means of sensors 44 connected thereto, the central control device 134 can thus identify, on the one hand, certain operating parameters and states, for instance the position of the gondola 14, its operating speed, the horizontal displacement, the weight of the gondola 14, the rotational speed of a flywheel mass 28, the amount of energy stored, motor operational data, the openings in the towers 12a (closed, open, . . . ), etc. Of course, telematics data can also be captured by sensors in the machine house of a wind turbine 12 and subsequently processed.

By means of the actuators 136 provided, the central control unit 134 is able to influence operating parameters and states. This can involve, for example, controlling the locking device 106 (FIG. 4) between the gondola 14 and the tower, depending on the position of the gondola 14 relative to the tower, or controlling the lighting 108 (FIGS. 4 and 8) under the protective roof, or controlling position lights 108 (insofar as any are provided on the towers 12a and/or other parts of the wind farm) depending on brightness, or automatically releasing or operating doors, or influencing the speed of the gondola 14, including bringing it to a stop.

In one alternative embodiment of the invention, the control system 134 can be decentralized. To this end, separate control systems 134 can be provided in at least two of the wind turbines 12 on a wind farm, said systems communicating with each other and with the gondola 14. In this way, operating parameters and states can similarly be identified and analysed. Each control system 134 can be connected with a predefinable portion of the sensors 44 and/or actuators 136. One advantage of this decentralized solution is the redundancy thus provided, such that in the event of a control unit failure, neighboring control units 134 can take over its functions.

In one particularly advantageous development of the invention, support masts are provided between wind turbines 12 on a wind farm in order to support the cable connection and in this way prevent excessive sag of the cable connection between the towers, as well as the loads that can ensue as a result of large spans between the towers 12a of the wind turbines 12 on a wind farm.

The wind farm according to the invention is preferably equipped with at least one accommodation area for accommodating at least one person. The space within said accommodation area is preferably organized into different functional areas, such as a sanitation area and/or a kitchen area and/or a pantry area and/or a rest area 144, and it is particularly preferable that it be integrated into the tower 12a of a wind turbine.

In one alternative embodiment of the invention, the accommodation area is located separately from the wind turbines 12 but within the wind farm. This location can be a separate platform, for example, or can preferably be on a platform mounted on a tower 12a of a wind turbine.

Said platform can serve additional functions, such as those of a helicopter pad and/or a ship's berth.

Due to the limited area inside the tower, the accommodation area 144 in a preferred development of the invention is distributed among several interconnected levels 144a-144b inside the tower. Within the accommodation area 144, equipment for communicating 148 and signalling 146 predefined data are provided. Said signalling may include acoustic and optical signalling, or an appropriate way of recording the data.

Communication includes voice and/or data communication on wire or wireless communication links, on the one hand with remote stations outside the wind farm, such as remote operations or maintenance centers, and on the other hand with remote stations inside the wind farm, such as other wind turbines 12 or the gondola 14 of the cable car system.

In a particularly preferred embodiment of the invention, communication also includes influencing predefined operating parameters of the wind farm facilities, as well as surveillance and control of wind farm operation. By this means, a continuously manned monitoring station can be created on the wind farm according to the invention, which monitoring station can respond immediately in the event of faults or failures occurring, and can take or initiate appropriate counter-measures.

In one particularly preferred development of the invention, a water treatment plant 150 for supplying the personnel with drinking water and service water is provided, said plant being operated with electrical energy generated on the wind farm. To bridge gaps in supply due, for example, to windless conditions, a suitably dimensioned energy storage means is provided to ensure that emergency operations at least are maintained in order to continue supplying the accommodation area 144 with energy and water.

The energy storage means 152 used for this purpose can be storage means for electrical power, such as capacitors, chemical means of energy storage, such as batteries, or storage means for hydrogen which are charged with hydrogen obtained from seawater by electrolysis, and from which electrical energy can be obtained in a fuel cell 166.

In one particularly preferred embodiment of the invention, at least the wind turbine 12 equipped with the accommodation area 144 includes equipment for weather observation 154, and/or for detecting, analysing, recording and/or forwarding meteorological data. Furthermore, the wind turbine 12 or additional wind turbines 12 in the wind farm can perform functions as navigational aids 156 for shipping, for example in the form of a sea marker or as a station 158 for providing (first) aid to persons involved in accidents, or to shipwrecked persons.

In one development of the invention, at least one wind turbine 12 equipped with an accommodation area has a viewing platform 160 provided on the tower 12a of the wind turbine 12 below the machine house. Said viewing platform can encircle the tower 12a of the wind turbine 12 either completely, or at least partially in a preferred direction, and be fitted with windows 162 that enable the surrounding area to be monitored. Said viewing platform can also be equipped with devices for signalling data, for influencing predefined operating parameters and/or for communication. The wind turbine 12 with the viewing platform is positioned within the wind farm in such a way that a maximum number of the wind turbines 12 in the wind farm can be seen from that position.

The viewing platform can be provided in close physical proximity to the accommodation area, or form an integral part thereof. Alternatively, the viewing platform and the accommodation area can be spatially separated, with the accommodation area located below the viewing platform near the base of the tower 12a in order to permit more generous dimensions of the rooms, whereas the viewing platform is located immediately below the machine house to enable good observation of the surroundings.

If the distance between the viewing platform and the accommodation area is large, an elevator 164 can be provided inside the tower 12a to save time when making several trips a day between the viewing platform 162 and the accommodation area 144, on the one hand, and to limit the physical burden on the personnel, on the other hand. The elevator 164 can be equipped with an emergency telephone facility so that help can be called in the event of the elevator 164 breaking down.

BRIEF DESCRIPTION OF THE SEVERAL
VIEWS OF THE DRAWING(S)

One embodiment shall now be described in detail with reference to the figures. These show.

DETAILED DESCRIPTION OF THE INVENTION

Elements 100-166 shown in the drawings are provided merely for indicating the presence of the elements in the wind farm of the present invention. The manner of how the illustrated elements are shown in the instant drawings shall not be construed as limiting or as a representation of the specific arrangements, configurations, locations or orientations of the illustrated elements.

Figure 1:
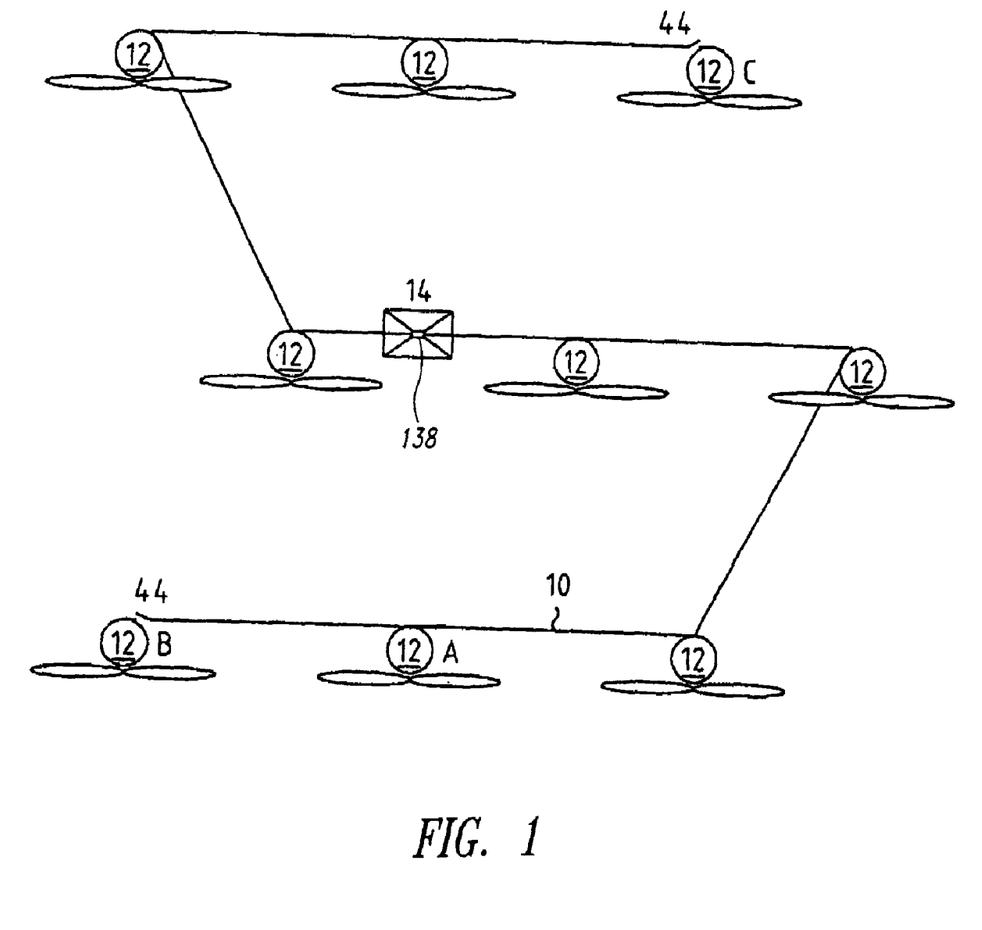
FIG. 1 a first variant of the cable system on a wind farm.

FIG. 1 shows a wind farm comprising nine wind turbines 12. Wind turbines 12 are arranged in three rows, each comprising three wind turbines 12 and connected with each other by a cable connection 10 in such a way that the gondola 14 can reach the separate wind turbines 12 separately and consecutively. Thus, when travelling from one end of the cable connection 10 to the other end of the cable connection 10, the gondola 14 always passes all the wind turbines 12 on the wind farm.

The cable connection 10 can be an endless cable loop on which the gondola 14 is fixedly disposed. Therefore, when the cable moves, the gondola 14 is inevitably moved as well.

If the endless cable loop lies in a substantially horizontal plane, the cable can be driven in a constant direction at all times, in the simplest case, and the gondola 14 moves in the opposite direction after passing the deflection point, thereby being shifted by the horizontal dimension of the endless cable loop.

However, since this also applies when travelling from one wind turbine 12 to an adjacent wind turbine 12 in the opposite direction, it may be necessary to pass all the other wind turbines of the wind farm such that the gondola 14 must travel almost twice the length of the cable connection 10.

For example, if the gondola 14 is located at the wind turbine marked A and must now travel to the wind turbine marked B, it must first travel, in the case of a unidirectional cable drive, to the wind turbine marked C and from there back to the destination wind turbine marked B. In doing so, it travels the entire length of the cable connection almost twice.

If it is possible to drive the cable connection in two directions, all that is needed for the trip from A to B is a reversal of the direction of travel and a short trip between two wind turbines.

If the cable connection 10 is an endless cable connection in a substantially vertical plane, a means for driving the cable connection 10 in two directions is absolutely essential, since otherwise the gondola 14 fixedly attached to the cable connection 10 would get into a hazardous situation at the latest on reaching the reversal point on the endless cable loop.

For this reason, sensors 44 are provided on the wind turbine 12 marked B and C in the figure, wherein said sensors identify when their position is reached by the gondola 14, and thus initiate a stop or redirection procedure. For the sake of simplicity, these sensors 44 are shown as switches. Other types of sensor, such as Hall sensors, optical sensors, etc., are also suitable, of course, for determining whether the gondola 14 has reached this position. Of course, the position of the sensors is chosen so that there is still sufficient stopping distance even when the gondola 14 is loaded. Some embodiments may include a GPS module 138 disposed in the gondola 14.

Figure 2:
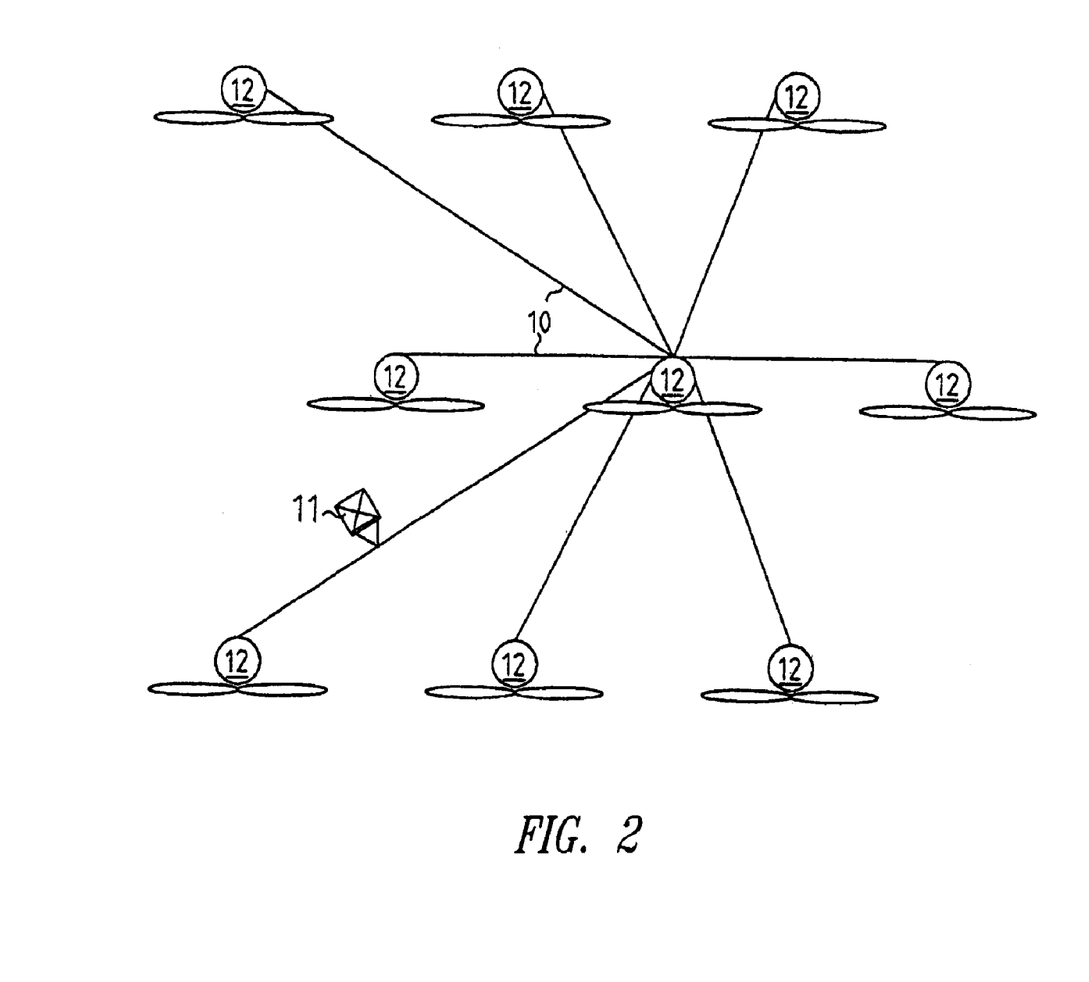
FIG. 2 a second variant of the cable system on a wind farm.

FIG. 2 similarly shows a wind farm comprising nine wind turbine 12 arranged in three rows each with three wind turbine 12. In this arrangement, there is a central wind turbine 12 that can have special docking and storage facilities, for example. Radiating from this central wind turbine 12, there is a star-shaped arrangement of cable connections 10 connecting to all the other wind turbine 12 of the wind farm. This results in the shortest possible paths for the gondola 14 (not shown in this figure) to reach the other wind turbines 12—each measured from the central wind turbine 12.

However, a trip from one of the non-central wind turbines 12 to another non-central wind turbine 12 always leads firstly to the central wind turbine 12 and onwards from there to the destination wind turbine 12.

Also shown in this figure is a support mast 11 at a cable connection 10. Said support mast 11 supports the cable connection 10, thus preventing excessive sag of the cable connection 10 in the case of large spans between two wind turbines 12.

This sag results from the cable connection's own weight. Depending on the properties of the cable connection 10, there is a maximum distance between two support points for the cable connection 10, which if exceeded may result in the cable connection 10 severing under its own weight. However, even with a lower spacing between the support points, the sag in the cable connection 10 may already be too great, causing the gondola 14 to come too close to the water surface.

This could be counteracted, theoretically, by having a higher tension in the cable connection 10. However, if a higher tension in the cable connection arises due to the effect of cold temperatures, the tensile strength may be exceeded and the cable connection 10 will sever. In other words, depending on the material used, a certain amount of sag in the cable connection 10 is unavoidable. By using support masts 11, these problems can be solved.

Figure 3:
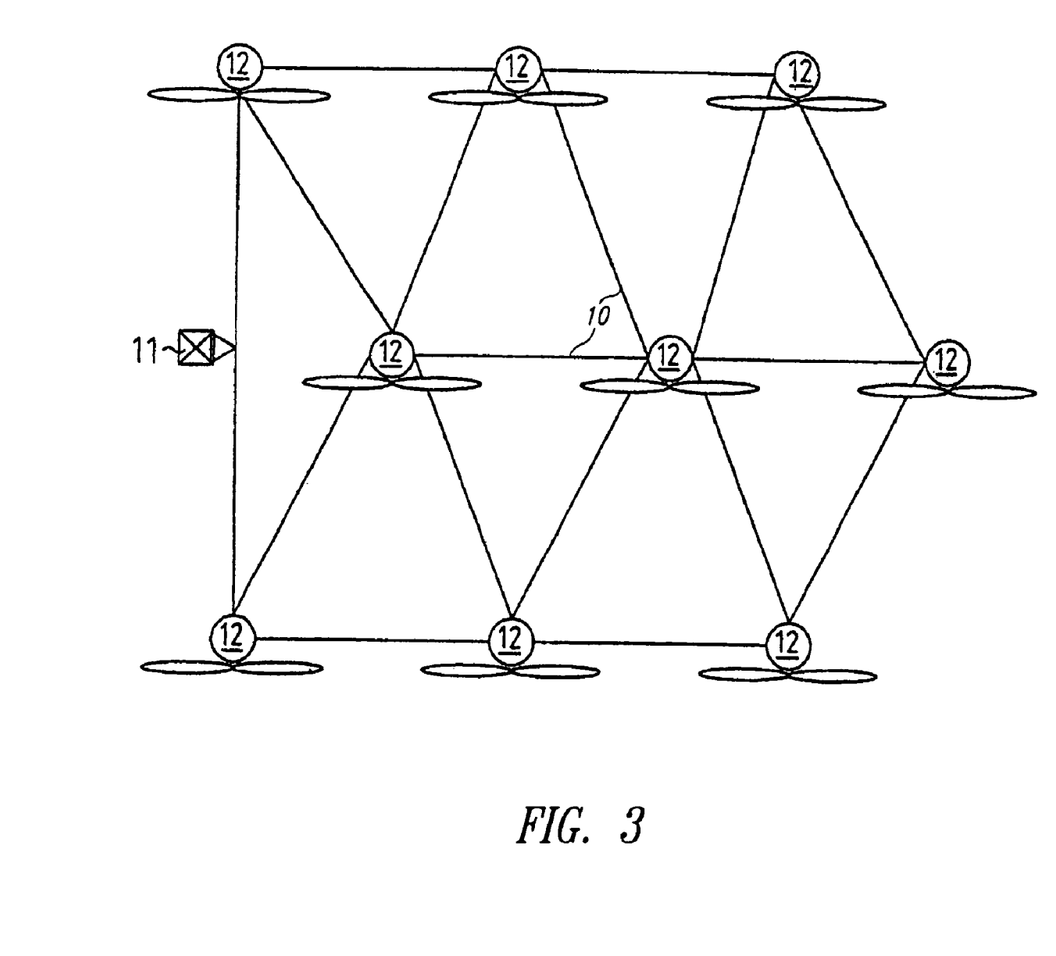
FIG. 3 a third variant of the cable system on a wind farm.

FIG. 3 shows the same arrangement of wind turbines 12 as in FIGS. 1 and 2. The difference again consists in the structure of the cable connection 10 between the wind turbine 12. In FIG. 3, the structure is like that of a network, such that each wind turbine 12 forms a node in the network. By means of this cable structure, even shorter distances ensue for particular stretches over which the gondola 14 (not shown in the figure) can reach particular wind turbine 12.

In this figure, too, a support mast 11 is provided for a large span between two wind turbines 12 in order to limit the sag and the tension in the cable connection 10. Of course, support masts 11 can be used in any segment of the cable connection 10 between two wind turbines 12, in order to gain additional support points for the cable connection 10.

Figure 4:
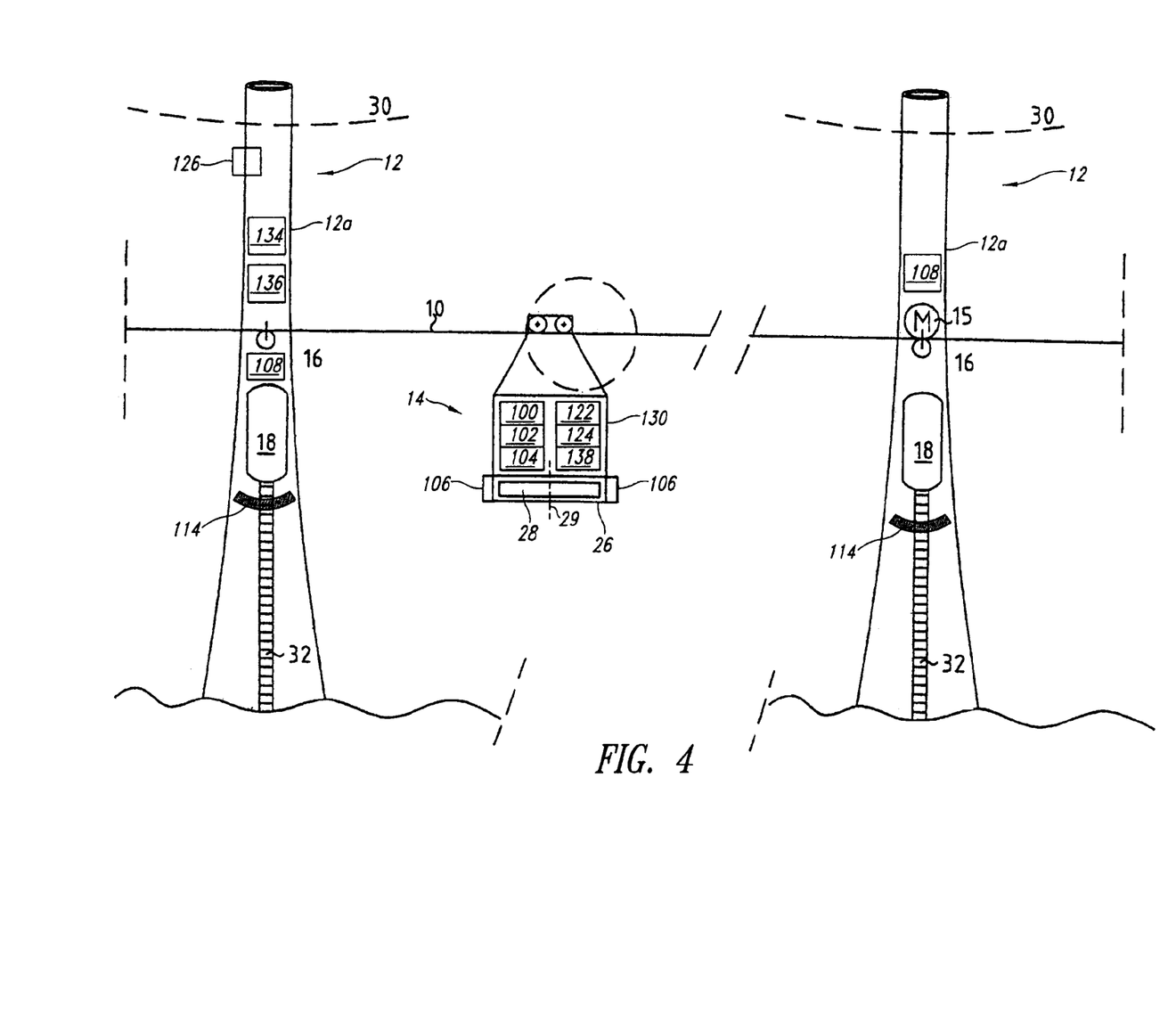
FIG. 4 the path of the cable connection between two wind turbines.

FIG. 4 shows two wind turbines 12 that are connected with each other by a cable connection 10. The upper portions of the towers 12a have been left out in the figure, although the lower edge of the area swept by the rotors is shown by a broken line 30. Each of the towers 12a has an opening 18 that can be closed with a door, and from each opening a ladder 32 is provided that leads to the base of the tower. The opening 18 in the tower 12a is provided at the height at which the gondola 14 reaches the tower.

Above the opening 18 on each tower, a deflection member 16 is provided through which the cable connection 10 is guided. The gondola 14 is located on said cable connection 10. Depending on the embodiment of the cable connection 10, the gondola 14 is carried and/or driven by the cable connection, or the gondola 14 moves under its own power along the cable connection 10.

In the example shown, a drive motor 15 is located on the tower 12a of a wind turbine 12 above the deflection pulley 16, said drive motor being able to drive the cable connection 10 in appropriate manner in the case of a gondola 14 that is not self-propelled.

In the lower part of the gondola 14 there is an additional compartment 26 that is separated from the gondola cabin 130 by the floor of the latter. Inside said compartment 26 there is a flywheel mass 28 which by means of a drive motor is kept at a high speed of rotation about its rotational axis, shown as a broken line. As a result of this rotation, the flywheel mass 28 acts as a gyroscope and stabilises the gondola 14 in its position by counteracting any horizontal displacement on the part of the gondola 14. By this means, the gondola 14 is stabilised while travelling and displaced to only a limited extent, even when cross winds occur.

Figure 5:
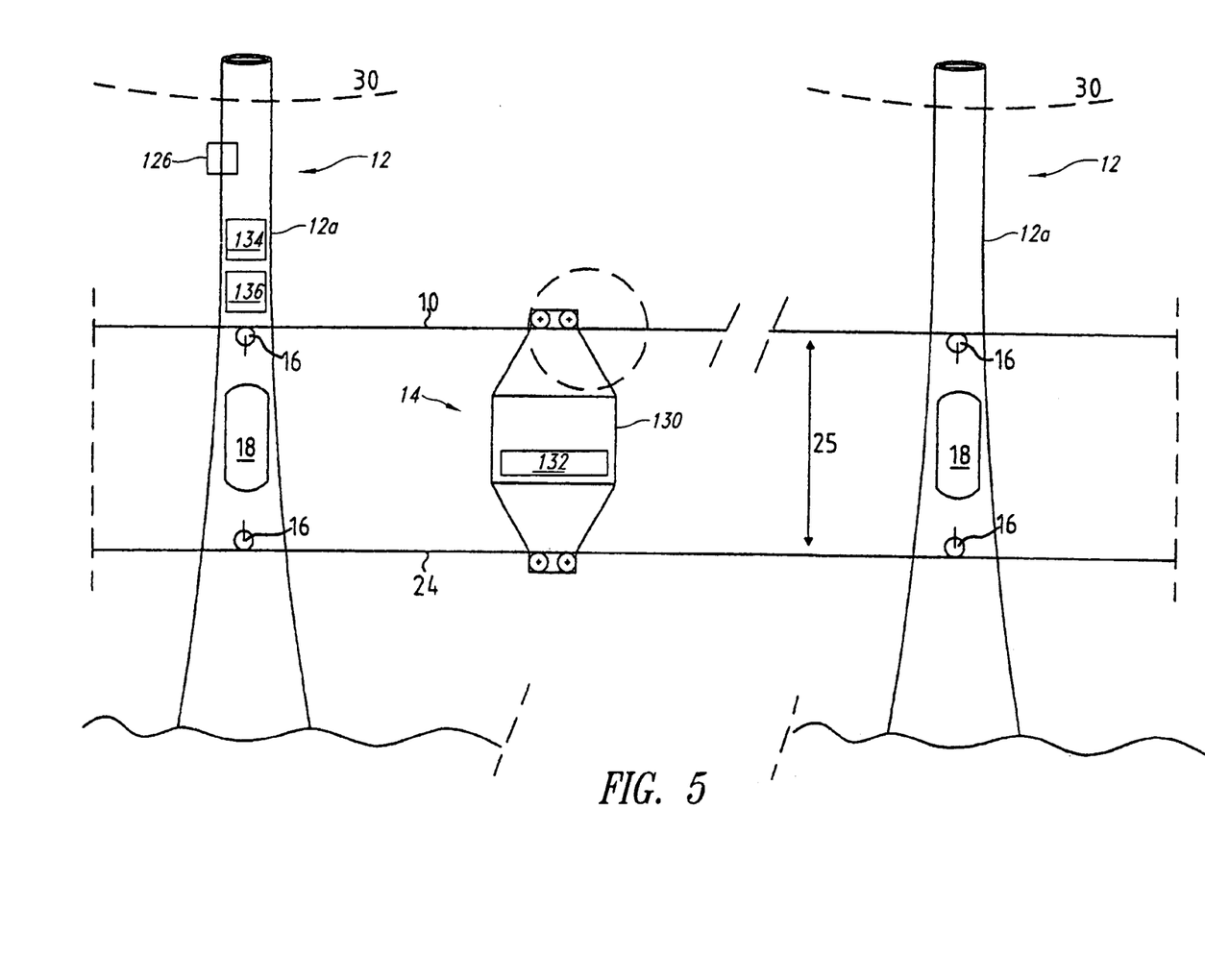
FIG. 5 an alternative cable arrangement.

The drawing in FIG. 5 similarly shows two towers 12a of wind turbines 12, the upper portions of which have been omitted from the figure. However, the lower portion of the area swept by the rotors is again shown. In the towers, the closeable openings 18 are shown at the height at which the gondola 14 reaches the wind turbines 12.

Above the opening 18 there are deflection members 16 through which the cable connection 10 is guided. The gondola 14 is disposed on said cable connection 10 and can be made to travel between the wind turbines.

Deflection members 16 are also provided below the openings 18. By means of these additional deflection members 16, a further cable connection in the form of a holding cable 24 is guided. Said holding cable 24 runs at a predefined vertical distance 25 parallel to the cable connection 10 and guides the gondola 14. By this means, the horizontal excursion of the gondola 14 is limited, because it is guided both above and below by cables 10, 24.

The potential horizontal displacement of the gondola 14 varies according to the distance to the next wind turbine 12. When the distance between gondola 14 and wind turbine 12 decreases, the stabilising effect of deflection members 16 increases, and the potential horizontal displacement of the gondola 14 is accordingly lower, whereas when the distance between the gondola 14 and a wind turbine 12 increases, the amount of sag in the cable connection 10 and the holding cable 24 increases. In the middle of the stretch between two wind turbines 12, the sag is at its greatest, and hence the potential horizontal displacement of the gondola 14 is at its maximum.

Figure 6:
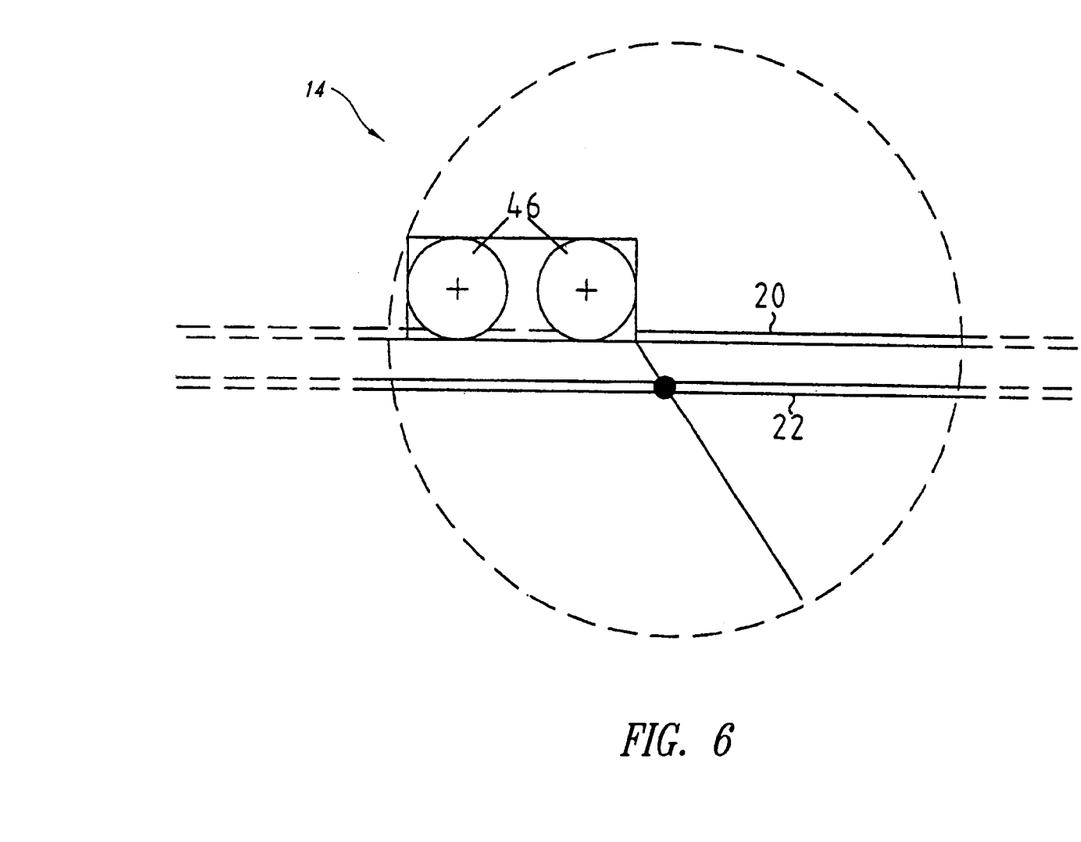
FIG. 6 suspension and drive of the gondola by means of a main cable and a traction cable.

FIG. 6 shows an enlarged view of the portions enclosed by a broken circular line in FIG. 4 and FIG. 5. The cable connection 10 is formed by two cables 20, 22. The upper cable 20 is provided as a main cable and carries the gondola 14 which is moveably disposed thereon with two guide sheaves 46. The lower cable 22 is a traction cable and is fixedly attached to the gondola 14. By operating said traction cable 22, the gondola 14 can be moved in a suspended position along the main cable.

Figure 7:
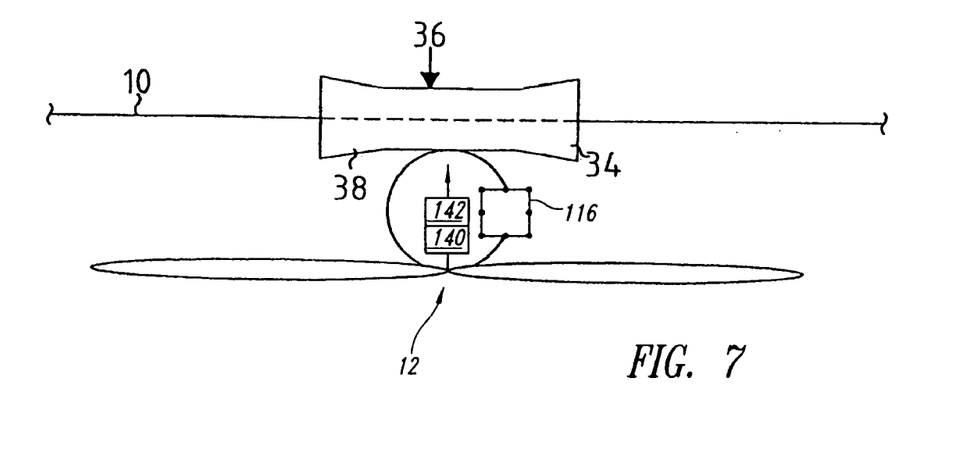
FIG. 7 a plan view of a wind turbine with a protective roof.
Figure 8:
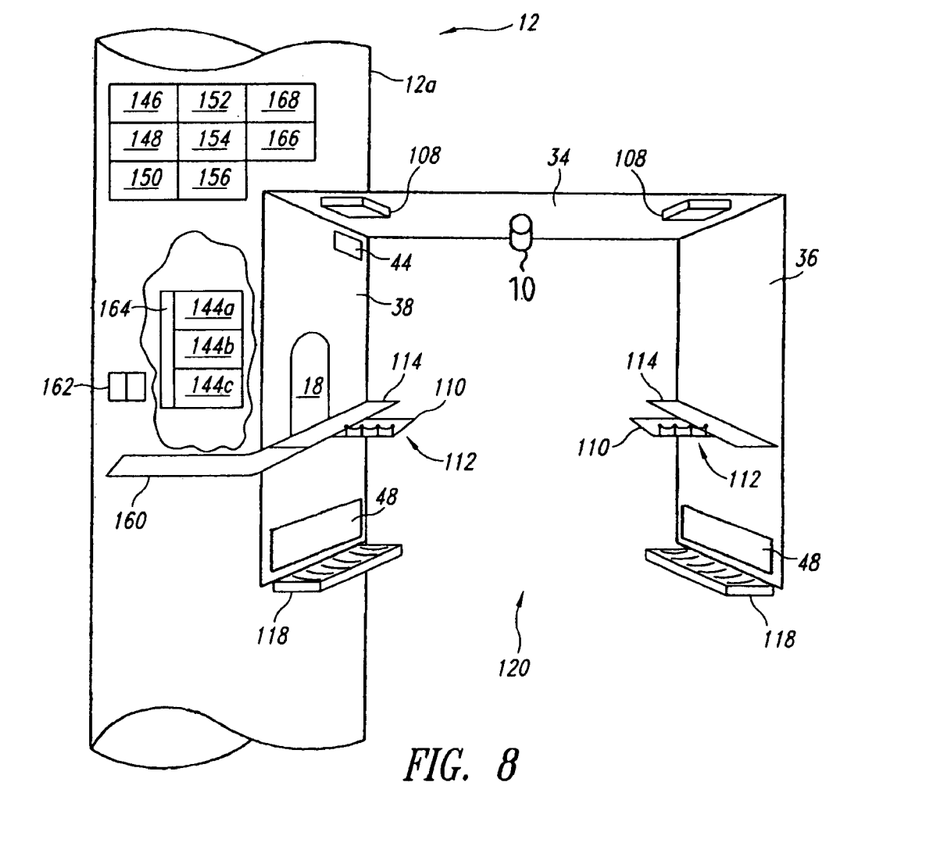
FIG. 8 a side elevation view of the tower with the protective roof.

FIGS. 7 and 8 show a wind turbine 12 (FIG. 7) and a portion of the tower 12a of the wind turbine 12 (FIG. 8) with a cover 34 of substantially horizontal extension disposed thereon. FIG. 7 is a plan view and FIG. 8 a side elevation view.

The cable connection 10 runs below said cover 34; the means by which it is suspended is not shown here for the sake of a better overview. Protective walls 36 are disposed on each of the two sides of the cover 34 that run parallel to the cable connection 10.

In combination with the cover 34, these protective walls 36 form a protective roof that protects the gondola 14 and the opening 18 in the tower 12a of the wind turbine 12 against the weather. Said protective roof extends on both sides of the opening 18, parallel to the cable connection 10.

Due to the fact that, while the gondola 14 is travelling between two wind turbines 12, horizontal displacement of the gondola 14 is possible at all times, albeit limited in respect of amount and direction, the outer ends of the protective roof are widened. The spacing between the protective walls 36 increases in predefined portions of the protective roof with increasing distance from the opening 18. In the middle portion, near the opening 18, the dimensions of the protective roof can be substantially equal to those of the gondola 14.

By means of the greater spacing between the protective walls 36, the gondola 14 can be moved between the protective walls and hence into their lee side, even when, for example, the gondola 14 is horizontally displaced by cross winds. Owing to the shelter from the wind thus provided, the gondola 14 is no longer displaced and for this reason the spacing between the protective walls 36, 38 can be made smaller.

Elastic coatings 48 are provided on the protective walls 36, 38 in the entry area, said coatings being intended to dampen any collision of the gondola 14 with the protective walls 36, 38 in such a way at least that no significant damage occurs. Independently of these coatings 48 on the protective walls 36, 38, similar coatings can be provided on the gondola 14, for example in the form of fenders.

The invention claimed is:

1. An off-shore wind farm, comprising:
a plurality of wind turbines positioned over water to be in the form of an off-shore wind farm; a cable connection interconnecting the plurality of wind turbines at a predetermined height; a gondola disposed on said cable connection for traveling along said cable connection; and said cable connection being configured as either a star configuration or a network configuration, where in the network configuration the cable connection provides direct cable travel paths for the gondola from any one of the wind turbines directly to at least three other ones of the wind turbines.

2. The wind farm according to claim 1 wherein the cable connection is spanned as an endless cable loop between deflection members at the wind turbines and by a rigid connection between the cable connection and the gondola.

3. The wind farm according to claim 2 wherein the cable connection comprises a main cable, a traction cable, and the gondola, the gondola being moveably connected to the main cable and fixedly connected to the traction cable, which extends as an endless cable loop along the deflection members.

4. The wind farm according to claim 2 wherein the deflection members include two independently rotatable deflection pulleys.

5. The wind farm according to claim 1 wherein the cable connection comprises a main cable, a traction cable, and the gondola, the gondola being moveably connected to the main cable and fixedly connected to the traction cable.

6. The wind farm according to claim 5 wherein the traction cable is driven by a motor.

7. The wind farm according to claim 1 wherein the gondola moves along the cable connection under its own power.

8. The wind farm according to claim 7, further comprising an electric motor drive for moving the gondola along the cable connection.

9. The wind farm according to claim 8 wherein the motor drive receives drive power from a store of energy carried in the gondola.

10. The wind farm according to claim 8 wherein electrical energy generated in the wind farm is used to power the electric motor drive.

11. The wind farm according to claim 10 wherein the electrical energy is selectively drawn at a generator or an intermediate DC circuit of one of the plurality of wind turbines.

12. The wind farm according to claim 1, further comprising a manually operable drive for moving the gondola along the cable connection.

13. The wind farm according to claim 1 further comprising a remotely controllable drive for moving the gondola.

14. The wind farm according to claim 13, wherein a portion of the cable connection is configured to serve as an electrical conductor.

15. The wind farm according to claim 14, further comprising an electrical cable integrated into the cable connection.

16. The wind farm according to claim 1 wherein the cable connection is configured as the network configuration, each of the plurality of wind turbines forms a node in the network configuration.

17. The wind farm according to claim 1 wherein a single cable connection connects each of the plurality wind turbines of the wind farm in a predeterminable sequence.

18. The wind farm according to claim 1 further comprising a locking device between the gondola and a tower of one of the plurality of wind turbines.

19. The wind farm according to claim 18 wherein the locking device is a electromagnetically operable holding magnet.

20. The wind farm according to claim 1, further comprising a holding cable extending parallel to the cable connection at a predefined distance therefrom.

21. The wind farm according to claim 20, further comprising deflection members coupled to each of the plurality of wind turbines for accommodating the holding cable.

22. The wind farm according to claim 20 wherein the cable connection and the holding cable are parts of an endless cable loop.

23. The wind farm according to claim 1 wherein the cable connection extends at a predefined horizontal distance from the tower of one of the plurality of wind turbines, and further comprising a holding cable extending at a predefined horizontal distance from the tower.

24. The wind farm according to claim 1 wherein the gondola includes a flywheel mass rotating about a vertical axis.

25. The wind farm according to claim 1, further comprising a set of points at the tower of each of the plurality of wind turbines along the cable connection.

26. The wind farm according to claim 1, further comprising load anchoring facilities and lashing means for securing objects to the anchoring facilities in the gondola.

27. The wind farm according to claim 1, further comprising a hoisting device located on the gondola for handling the load being carried.

28. The wind farm according to claim 1, further comprising hoisting apparatus at the tower of one of the plurality of wind turbines.

29. The wind farm according to claim 1, wherein the gondola includes an enclosed gondola cabin.

30. The wind farm according to claim 1, further comprising an elastic coating at a location on the gondola where a risk of collision with other wind farm facilities is greatest.

31. The wind farm according to claim 30 wherein the elastic coating serves simultaneously as a float.

32. The wind farm according to claim 1 wherein the gondola is buoyant.

33. The wind farm according to claim 1, further comprising a control coupled to actuators.

34. The wind farm according to claim 33 wherein the central control device is disposed in one of the plurality of wind turbines of the wind farm.

35. The wind farm according to claim 33, further comprising a sensor configured to detect when the gondola passes by.

36. The wind farm according to claim 1, further comprising a GPS module disposed in the gondola.

37. The wind farm according to claim 1 wherein energy is transported within the wind farm in a form other than electricity.

38. The wind farm according to claim 1, wherein one of the plurality of wind turbines includes an accommodation area for accommodating at least one person.

39. The wind farm according to claim 38, wherein the accommodation area is equipped with a sanitary area, and a kitchen area, a pantry area or a rest area.

40. The wind farm according to claim 38 wherein the accommodation area is integrated into the tower of the one of the plurality of wind turbines.

41. The wind farm according to claim 40 wherein the accommodation area is arranged in a plurality of interconnected levels.

42. The wind farm according to claim 38, further comprising a device for signalling predefined data or a device for influencing predefined operating parameters within the accommodation area.

43. The wind farm according to claim 38, further comprising a communications facility for exchanging information.

44. The wind farm according to claim 38, further comprising a water treatment plant for supplying personnel with drinking water and service water.

45. The wind farm according to claim 38, further comprising energy storage means for storing energy to bridge gaps in power supply.

46. The wind farm according to claim 38, further comprising devices for weather observation.

47. The wind farm according to claim 38 wherein the accommodation area includes navigational aids for shipping or equipment for helping injured or shipwrecked persons.

48. The wind farm according to 38 wherein the accommodation area includes a viewing platform.

49. The wind farm according to claim 48, wherein the viewing platform includes windows to enable the surroundings of the one of the plurality of wind turbines to be monitored.

50. The wind farm according to claim 48, further comprising an elevator between the accommodation area and the viewing platform.

51. The wind farm according to claim 1 further comprising a closable opening in a tower of at least one of the plurality of wind turbines at a height at which the gondola reaches the towers.

52. The wind farm according to claim 51, further comprising a locking device coupled to the tower of one of the plurality of wind turbines at the height of the gondola near the opening.

53. The wind farm according to claim 51, further comprising a cover of substantially horizontal extension disposed above the opening on the tower of the one of the plurality of wind turbines.

54. The wind farm according to claim 53, further comprising a first protective wall disposed on the side of the cover facing away from the tower, said protective wall extending substantially vertically and at a predefined distance parallel to the cable connection.

55. The wind farm according to claim 54, further comprising a second protective wall disposed at the tower of the wind turbine at the height of the opening and extending substantially parallel to the cable connection.

56. The wind farm according to claim 55 wherein the second protective wall comprises two parts extending a predefined length on both sides of the opening.

57. The wind farm according to claim 55, further comprising a gap between the first protective wall and the second protective wall, said gap increasing in size in a predefined portion at a distance from the opening.

58. The wind farm according to claim 55, further comprising an elastic coating of predefined thickness on at least one of the protective walls.

59. The wind farm according to claim 55, further comprising a light on the cover or the protective walls.

60. The wind farm according to claim 51, further comprising a gangboard extending substantially parallel to the cable connection, said gangboard being reachable from the opening and having at least one retention facility along its entire length.

61. The wind farm according to claim 51, further comprising a working platform coupled to the outside of the tower of the one of the plurality of wind turbines, wherein said platform can be reached from the opening.

62. The wind farm according to claim 51, further comprising a crown safety platform outside the tower of the one of the plurality of wind turbines, wherein said platform can be reached from the opening.

63. The wind farm according to claim 51, further comprising a first guide rail disposed on the tower of the one of the plurality of wind turbines close to the opening and extending substantially parallel to the cable connection.

64. The wind farm according to claim 63, further comprising a second guide rail extending at a predefined distance substantially parallel to the first guide rail.

65. The wind farm according to claim 64, further comprising a gap between the first guide rail and the second guide rail, said gap increasing in size in a predefined portion at a distance from the opening.

66. The wind farm of claim 64 wherein the guide rails support the protective walls.

67. The wind farm according to claim 51 wherein the closeable opening is larger than the gondola and the cable connection extends through the opening into the inside of the tower of the one of the plurality of wind turbines.

68. The wind farm according to claim 1, further comprising a mast disposed between towers of two of the plurality of wind turbines for supporting the cable connection.

69. A method of transport between individual ones of a plurality of wind turbines, comprising: positioning an object to be transported in a gondola coupled to a cable that spans the individual ones of the plurality of wind turbines; moving the gondola from a first one of the plurality of turbines to a second one of the plurality of turbines along the cable; removing the object from the gondola; wherein, said cable being configured as either a star configuration or a network configuration, where in the network configuration the cable provides direct cable travel paths for the gondola from any one of the wind turbines directly to at least three other ones of the wind turbines.

70. The method of claim 69 wherein the object is a person.

71. The method of claim 69 wherein the cable is a continuous loop and configured to circulate between the first and second ones of the plurality of turbines with the gondola affixed to a point on the cable.

72. The method of claim 69, further comprising controlling movement of the gondola from within the gondola.

73. The method of claim 69, further comprising moving the gondola from the second one of the plurality of turbines to a third one of the plurality of turbines.

74. The method of claim 69 wherein one of the plurality of wind turbines is standing in water.

75. The method according to claim 69 further comprising a step of moving the object through a closeable opening in the tower of at least one of the plurality of wind turbines at a height at which the gondola reaches the tower.

76. A system, comprising: a plurality of off-shore wind turbines, each of the plurality including a tower located over the water and a rotor at the top of the tower; a cable connection including cables, each cable extending over water and coupled at a first end to a first one of the plurality of wind turbines and at a second end to a second one of the plurality of wind turbines; a gondola coupled to the cable and configured to travel along the cable from the first turbine to the second turbine; and said cable connection being configured as either a star configuration or a network configuration, where in the network configuration the cable connection provides direct cable travel paths for the gondola from any one of the wind turbines directly to at least three other ones of the wind turbines.

77. The system according to claim 76 further comprising a closeable opening in the tower of at least one of the plurality of wind turbines at a height at which the gondola reaches the tower.

78. The system of claim 76 wherein the plurality of wind turbines are standing offshore.

79. An off-shore wind farm, comprising: a plurality of wind turbines positioned over water; a cable connection interconnecting the plurality predetermined height; a gondola disposed on said cable connection for traveling along said cable connection; said cable connection being configured as either a star configuration or a network configuration, where in the network configuration the cable connection provides direct cable travel paths for the gondola from any one of the wind turbines directly to at least three other ones of the wind turbines; and an elastic coating on an outside surface of the gondola that acts as a float for the gondola, the gondola being buoyant in water.

80. A wind farm, comprising: a plurality of wind turbines; a cable connection interconnecting the plurality of wind turbines at a predetermined height; a gondola disposed on said cable connection for traveling along said cable connection; said cable connection being configured as either a star configuration or a network configuration, where in the network configuration the cable connection provides direct cable travel paths for the gondola from any one of the wind turbines directly to at least three other ones of the wind turbines; and a control device including a central control unit and actuators, the central control unit being disposed in one of the plurality of wind turbines of the wind farm.

81. A wind farm, comprising: a plurality of wind turbines; a cable connection interconnecting the plurality of wind turbines at a predetermined height; a gondola disposed on said cable connection for traveling along said cable connection; said cable connection being configured as either a star configuration or a network configuration, where in the network configuration the cable connection provides direct cable travel paths for the gondola from any one of the wind turbines directly to at least three other ones of the wind turbines; and an accommodation area for accommodating at least one person in the turbine structure of at least one of the wind turbines, the accommodation area being equipped with a sanitary area, and a kitchen area, a pantry area or a rest area.

82. An off-shore wind farm, comprising: a plurality of wind turbines positioned over water provided with a cable connection interconnecting the plurality of wind turbines, and a gondola disposed on said cable connection for traveling along said cable connection; said cable connection being configured as either a star configuration or a network configuration, where in the network configuration the cable connection provides direct cable travel paths for the gondola from any one of the wind turbines directly to at least three other ones of the wind turbines; and an accommodation area for accommodating at least one person in the wind turbine structure of at least one of the wind turbines, the accommodation area including navigational aids for ships and equipment for helping injured or shipwrecked persons.

83. A wind farm, comprising: a plurality of wind turbines; a cable connection interconnecting the plurality of wind turbines at a predetermined height; a gondola disposed on said cable connection for traveling along said cable connection; said cable connection being configured as either a star configuration or a network configuration, where in the network configuration the cable connection provides direct cable travel paths for the gondola from any one of the wind turbines directly to at least three other ones of the wind turbines; and an accommodation area for accommodating at least one person in at least one of the wind turbines, the accommodation area being integrated into the tower of the one of the plurality of wind turbines.

84. A wind farm, comprising: a plurality of wind turbines; a cable connection interconnecting the plurality of wind turbines at a predetermined height; a gondola disposed on said cable connection for traveling along said cable connection; said cable connection being configured as either a star configuration or a network configuration, where in the network configuration the cable connection provides direct cable travel paths for the gondola from any one of the wind turbines directly to at least three other ones of the wind turbines; an accommodation area for accommodating at least one person in the turbine structure of at least one of the wind turbines; and a communications facility for exchanging information positioned within the accommodation area.

85. An off-shore wind farm, comprising: a plurality of wind turbines positioned over water provided with a cable connection interconnecting the plurality of wind turbines, and a gondola disposed on said cable connection for traveling along said cable connection; said cable connection being configured as either a star configuration or a network configuration, where in the network configuration the cable connection provides direct cable travel paths for the gondola from any one of the wind turbines directly to at least three other ones of the wind turbines; an accommodation area for accommodating at least one person in the wind turbine structure of at least one of the wind turbines; and a water treatment plant for supplying personnel with drinking water and service water from the water over which the wind turbine is positioned.

86. The off-shore wind farm according to claim 85 further comprising a closeable opening in a tower of at least one of the plurality of wind turbines at a height at which a gondola reaches the tower.

87. A wind farm, comprising: a plurality of wind turbines provided with a cable connection interconnecting the plurality of wind turbines, and a gondola disposed on said cable connection for traveling along said cable connection; said cable connection being configured as either a star configuration or a network configuration, where in the network configuration the cable connection provides direct cable travel paths for the gondola from any one of the wind turbines directly to at least three other ones of the wind turbines, at least a endless cable connection in said cable connection in the form of a loop interconnecting the wind turbines at a predetermined height.

88. The wind farm according to claim 87 wherein the endless cable is a traction cable in a loop to provide the power to move the gondola and further including a support cable to support the weight of the gondola, the support cable extending between adjacent wind turbines.

89. A wind farm, comprising: a plurality of wind turbines; a cable connection interconnecting the plurality of wind turbines at a predetermined height; a gondola disposed on said cable connection for traveling along said cable connection; said cable connection being configured as either a star configuration or a network configuration, where in the network configuration the cable connection provides direct cable travel paths for the gondola from any one of the wind turbines directly to at least three other ones of the wind turbines; and a flywheel mass rotating about a vertical axis, the flywheel mass being coupled to the gondola.

* * * * *